United States Patent [19]

Hessman et al.

[11] Patent Number: 4,893,969
[45] Date of Patent: Jan. 16, 1990

[54] CUTTING INSERT AND METHOD FOR CHIP REMOVING MACHINING

[75] Inventors: Anders B. I. Hessman, Sandviken; Leif R. Nyström, Järbo, both of Sweden

[73] Assignee: Sandvik AB, Sandviken, Sweden

[21] Appl. No.: 265,898

[22] Filed: Nov. 2, 1988

[30] Foreign Application Priority Data

Nov. 3, 1987 [SE] Sweden .................... 8704280

[51] Int. Cl.⁴ .............................. B26D 1/00
[52] U.S. Cl. ............................ 407/114; 407/115
[58] Field of Search ...................... 407/113–116; 409/131, 132

[56] References Cited

U.S. PATENT DOCUMENTS 4,367,990 1/1983 Porat et al. ................ 407/114
4,685,844 8/1987 McCreery et al. .......... 407/114

FOREIGN PATENT DOCUMENTS 0314647 5/1989 European Pat. Off. .

Primary Examiner—Steven C. Bishop
Attorney, Agent, or Firm—Burns, Doane, Swecker & Mathis

[57] ABSTRACT

A cutting insert for chip removing machining, preferably for milling, includes a rake face and a clearance face. A cutting edge is arranged at the line of intersection of those faces. The rake face comprises at least two adjacent, elongated ridges which extend along at least a part of the cutting edge. A first ridge connects to the cutting edge. A second of the ridges is arranged to become active after wear of the first ridge. The first ridge becomes worn to a substantial degree before the second ridge is activated.

9 Claims, 4 Drawing Sheets

CUTTING INSERT AND METHOD FOR CHIP REMOVING MACHINING

BACKGROUND AND OBJECTS OF THE INVENTION

The present invention relates to a cutting insert and a method for chip removing machining, preferably for milling. The insert has a rake face and a clearance face, a cutting edge being arranged at the line of intersection of the faces. The rake face comprises at least two adjacent, elongated ridges which extend along at least a part of the cutting edge and whereof a first ridge connects to the cutting edge. The method relates to relatively moving the cutting insert and a work piece.

Previously known inserts of the above-mentioned type, U.S. Pat. No. 4,367,990 for example, are all subjected to the drawback that when the first ridge has been worn to a certain extent the insert has to be exchanged or indexed in order not to damage the work piece or the insert holder.

One object of the present invention is to provide a cutting insert having a maximum length of life.

Another object of the present invention is to provide a cutting insert being compensated for wear.

Another object of the present invention is to provide a cutting insert such to give small cutting forces.

Still another object of the present invention is to provide a method for chip removing machining.

THE DRAWINGS

The invention will be more clearly described hereinafter in connection with the appended drawings wherein FIG. 1 shows a cutting insert according to the invention in a plane view, FIG. 2 shows the insert in a side view, FIGS. 3, 4 and 5 show cross sections of the insert according to the lines III—III, IV—IV and V—V, respectively, in FIG. 1, FIG. 6 shows a conventional insert in a cross section, FIG. 7 shows an insert according to the invention in a cross section and FIG. 8 is a principal diagram showing the dependence of the cutting forces on the time of engagement for different inserts.

DETAILED DESCRIPTION OF PREFERRED EMBODIMENTS OF THE INVENTION

Figure 1:
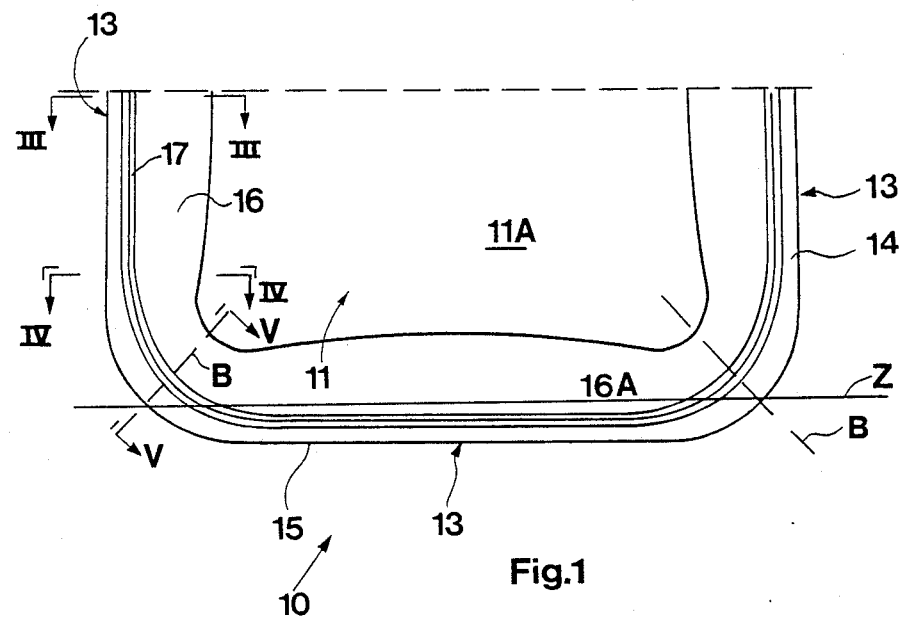
Figure 2:
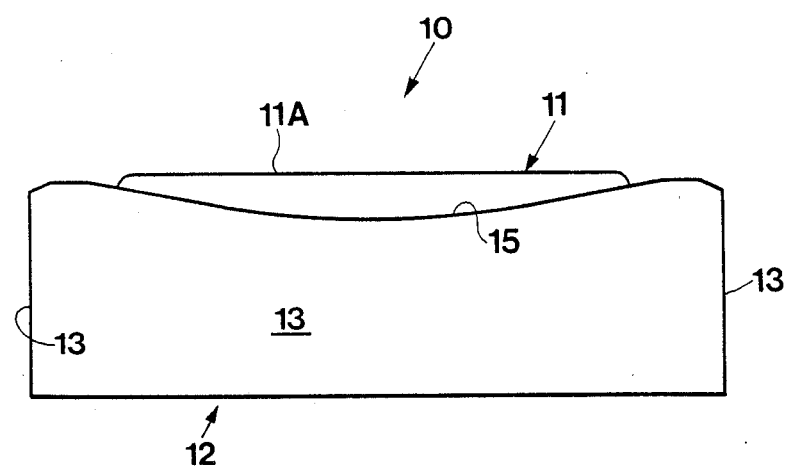
Figure 3:
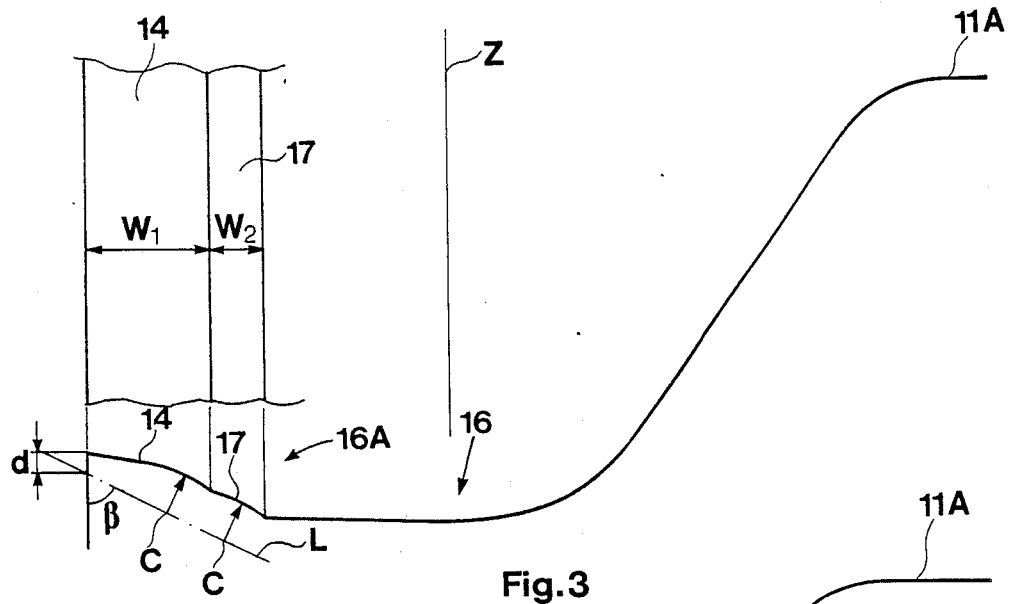
Figure 4:
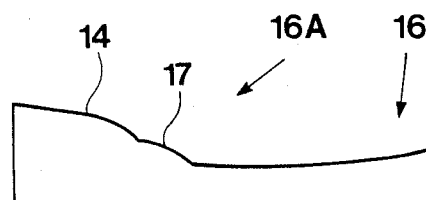
Figure 5:
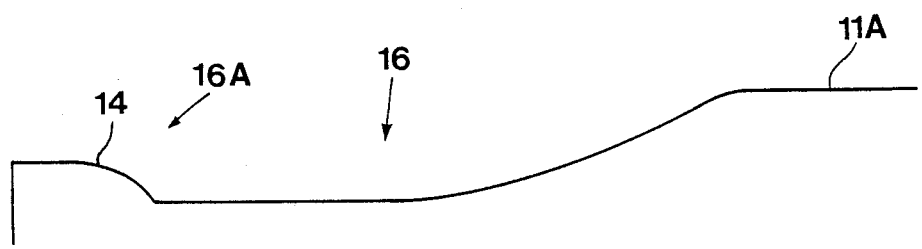

FIGS. 1 to 5 show a cutting insert 10 according to the invention for chip removing machining, preferably for milling of metal. The insert comprises two plane-parallel sides 11 and 12, which are perpendicularly connected by four edge surfaces 13 or clearance faces, i.e. the insert has a negative basic shape. Only one-half of the insert is shown in FIG. 1, for illustration purposes. However the other half of the insert is identical to the shown half. Alternatively the insert may have a positive basic shape. Two edge surfaces connect over a smoothly rounded corner having a large radius; between 2 and 5 mm. A peripheral first ridge 14 or a land is connected to the edge surfaces 13. The lines of intersection of the ridge 14 and the edge surfaces form cutting edges 15.

Furthermore the insert 10 is provided with a raised planar mid portion 11A whose periphery connects to a concave groove 16. A part of the groove along each cutting edge forms a rake face 16A which is defined as the part of the groove which has been arranged inside the cutting edge and which may engage with the chip during machining. The angle between the rake face 16A and the edge surface 13 is less than 90 degrees. The mid-portion may alternatively be recessed, non-planar and/or sloping.

The first ridge 14 has a mainly constant width $w_1$ along the major part of the cutting edge 15. However the ridge 14 expands in direction towards the bisector B of the insert corner. The ridge expands from about 0.5 to about 0.7 mm, preferably from 0.45 to 0.58 mm, in order to obtain a durable cutting corner during milling. Regarding the importance of the ridge expansion reference is made to commonly assigned European Patent No. 0 314 647, which is hereby incorporated in the description. The insert has a second ridge 17 arranged inside and below the first ridge. The second ridge 17 extends, just like the first ridge, between two adjacent insert corners and the width $w_2$ of the second ridge 17 expands in direction towards the bisector B of each insert corner. The width $w_1$ of the first ridge 14 is about double the width $w_2$ of the second ridge 17. The second ridge starts widening in connection with the start of curvature of the cutting edge 15 at the insert corner. The major portions or the straight portions, in plane projection, of the ridges 14 and 17 are arranged beyond an imaginary line Z intersecting points of intersection of the cutting edge 15 and the bisectors B at two adjacent corners. The highest point of the first ridge 14 relative to the lower surface 12 is arranged 0.04 to 0.05 mm higher than the highest point of the second ridge 17 relative to the lower surface 12. Each ridge describes at least partly a convex non-linear curve such as for instance an arch of a circle, a parabola curve, an ellipse curve or the like. In the preferred embodiment the curve is shaped as an arch of a circle which is defined by a radius r which is between 0.2 and 0.35, preferably about 0.29 mm. The centres C of radius of the ridges 14 and 17 lie on an imaginary line L which extends at a side of the cutting edge 15 such that the line intersects the edge surface at a distance d below the cutting edge. The distance d is preferably less than the radius r of each ridge. The line L forms an acute angle $\beta$ with the associated edge surface. The angle $\beta$ is larger than 60 degrees but less than 90 degrees.

Figure 6:
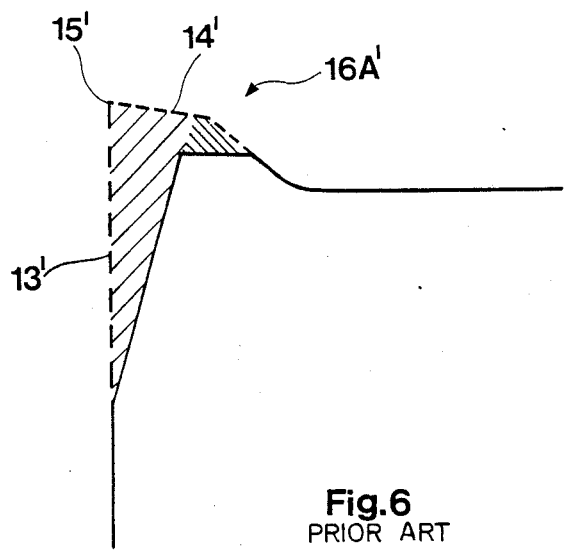

FIG. 6 shows a worn conventional insert comprising an edge surface 13', a rake face 16A' and a ridge 14'. A cutting edge 15' is arranged at the intersection of the rake face and the ridge. At machining with the known insert the clearance face 13' and the ridge 14' and the rake face 16A' are worn. During the wear of the insert the width of the ridge succesively decreases until breakage of the insert.

Figure 7:
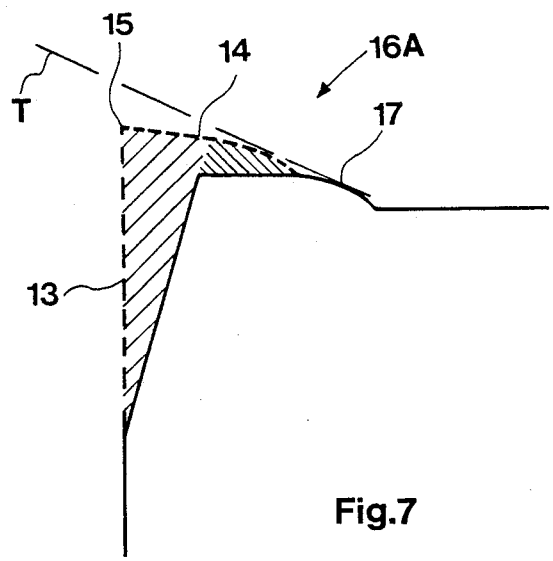

FIG. 7 shows an insert according to the present invention comprising an edge surface 13, a rake face 16A, two ridges 14 and 17 and a cutting edge 15. During machining with the fresh insert both the clearance face and the first ridge 14 will initially be worn such that the width of the ridge 14 successively decreases. After a period of time, further wear of the second ridge 17 will start acting as a strengthening land and therefore the width of the strengthening land will suddenly increase such to avoid insert breakage. Due to the rear smoothness a positive cutting engagement is obtained with an optimized contact surface between the chip and the strengthening land at each moment during wear of the insert and therefore the life of the insert is further extended. A tangent T which intersects each ridge forms an acute angle with the plane of the edge surface 13.

Figure 8:
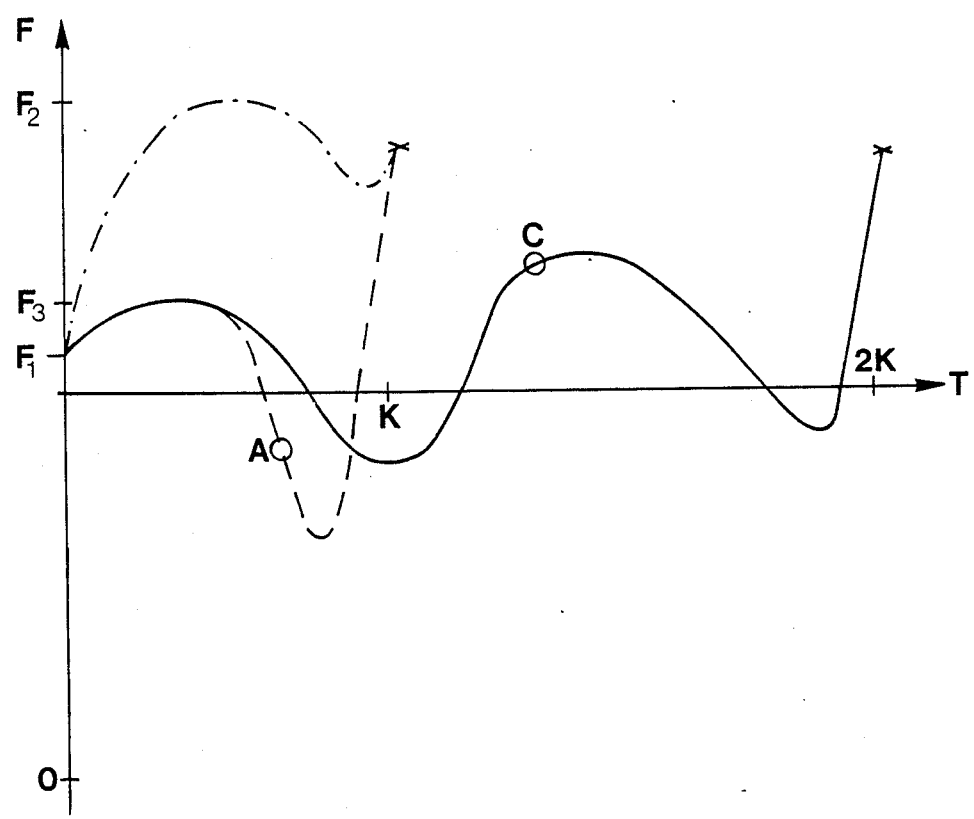

FIG. 8 is a diagram showing the dependence of the cutting forces on the time of cutting engagement. The machining starts at the time T=0 by the momentary increase of the force F up to the value $F_1$ which depends on the work piece, the cutting data and the insert geometry.

The curve represented by dots and broken lines shows force/time dependence for an insert which has a strengthening land not compensated for contact length. The known insert provides a substantial contact length since its strengthening land is wide and therefore the force increases up to a maximum value $F_2$ until the contact length decreases due to wear such that the force decreases whereafter an increase in force follows up to insert breakage due to deformations and fracturing. The breakage is represented by a cross in FIG. 8.

The broken line represents force/time dependence for an insert of the type shown in FIG. 6, which has a strengthening land whose width is optimized to gain smaller cutting forces during machining. The machining starts at the time 0 by achieving the cutting force $F_1$ as described above. The force increases to a maximum value $F_3$ which is substantially smaller than the value $F_2$ since the contact length is shorter. When the wear of the known insert starts such that the the contact length decreases then also the cutting force decreases during a short period of time. Then the surface pressure and the heat increases resulting in a plastic deformation of the insert upon which the force increases up to insert breakage. The wear according to FIG. 6 corresponds to the force and the time that are represented by the ring A in FIG. 8.

The continous line shows the force/time dependence for an insert according to the present invention. Said dependence substantially follows the broken line up to the value $F_3$. The continous line falls along a less sloping path relative to the broken line at the same time period in the diagram, because of the less drastically decreasing contact length for the insert according to the present invention, due to the convex inner portion of the first ridge 14. Then the curve reaches a minimum whereafter the cutting force successively increases, which comes from the contact between the chip and a portion of the second ridge 17, ie the contact length gradually increases. Again the contact length is shortened by wear which results in the force decreasing until the contact length during wear of the second ridge becomes so large such that the insert breaks in a known manner. Usually the insert are not used up to breakage. At comparison with the engagement time K of conventional inserts up to breakage, an insert according to the present invention achieves an engagement time or life which is double the time K. The wear according to FIG. 7 corresponds to the force and the time that are represented by the ring C in FIG. 8.

Thus the present invention relates to a cutting insert which compensates wear and which has a maximum life.

Further according to the present invention is provided a method of performing a cutting operation on a work piece by means of the above-described cutting insert. The method comprises the steps of relatively moving the insert 10 and the work piece, not shown, such that the cutting edge 15 cuts chips from the work piece during simultaneous wear of only the first ridge 14 and such that the second ridge 17 becomes active, i.e., starts forming chips, after a substantial wear of the first ridge. Preferably the first ridge is completely worn off. The method provides for an increase in production due to the fact that it allows a longer time of engagement for each insert.

We claim:

1. Indexable cutting insert for chip removing machining, comprising a rake face and a clearance face, a cutting edge being provided at the line of intersection of said faces, said rake face comprising at least two adjacent, elongated ridges which extend along at least a part of the cutting edge and wherein a first ridge connects to the cutting edge, characterized in that each ridge in cross-section at least partly describes a convex curve and in that a second ridge connects to the first ridge and is arranged below the first ridge such to become active after a substantial wear of the first ridge, the cutting insert being of polygonal basic shape having corner portions defining bisectors and in that major portions of the ridges are arranged beyond a first imaginary line intersecting the bisectors of two adjacent corner portions at the cutting edge of said corner portions.

2. Indexable cutting insert according to claim 1, wherein at least one ridge completely or partly tapers in direction towards the bisector of each corner portion.

3. Indexable cutting insert for chip removing machining, comprising a rake face and a clearance face, a cutting edge being provided at the line of intersection of said faces, said rake face comprising at least two adjacent, elongated ridges which extend along at least a part of the cutting edge and whereof a first ridge connects to the cutting edge, characterized in that each ridge in cross section at least party describes a convex curve and in that a second ridge connects to the first ridge and is arranged below the first ridge such to become active after a substantial wear of the first ridge, the angle between the rake face and the clearance face being less than 90 degrees, said ridge being provided below the first ridge in the height direction, said ridges together forming a positive rake angle and in that the number of ridges is between 2 and 10.

4. Indexable cutting insert for chip removing machining, comprising a rake face and a clearance face, a cutting edge being provided at the line of intersection of said faces, said rake face comprising at least two adjacent, elongated ridges which extend along at least a part of the cutting edge and whereof a first ridge connects to the cutting edge, characterized in that each ridge in cross section at least party describes a convex curve and in that a second ridge connects to the first ridge and is arranged below the first ridge such to become active after a substantial wear of the first ridge, at least a part of each ridge in cross-section is defined by a radius which has a center and in that an imaginary line which intersects said centers of radius extends below an associated edge, said imaginary line forming an acute angle with the associated clearance surface.

5. Indexable cutting insert according to claim 4, wherein the imaginary line intersects the associated clearance surface at a distance from the cutting edge, which distance is less than the radius of each ridge.

6. Indexable cutting insert according to claim 4, wherein the radius of each ridge is between 0.2 and 0.35 mm.

7. Indexable cutting insert according to claim 6, wherein the last-named radius is about 0.29 mm.

8. Indexable cutting insert according to claim 4, wherein the acute angle is larger than 60 degrees and less than 90 degrees.

9. Indexable cutting insert for chip removing machining, comprising a rake face and a clearance face, a cutting edge being provided at the line of intersection of said faces, said rake face comprising at least two adjacent, elongated ridges which extend along at least a part of the cutting edge and whereof a first ridge connects to the cutting edge, characterized in that each ridge in cross section at least party describes a convex curve and in that a second ridge connects to the first ridge and is arranged below the first ridge such to become active after a substantial wear of the first ridge, the cutting insert is adapted for face milling and comprises an upper surface, a lower surface, and edge surfaces joining the upper and lower surfaces of which two adjacent edge surfaces meet in a rounded corner portion defined by a radius and in that the first ridge is wider at the corner portion than at a straight part of the cutting edge and in that the width of the second ridge is at maximum half as large as the width of the first ridge.

* * * * *